United States Patent
Mo et al.

(10) Patent No.: US 12,407,942 B2
(45) Date of Patent: Sep. 2, 2025

(54) LOGARITHMIC CURVE GENERATION METHOD, DEVICE, AND STORAGE MEDIUM

(71) Applicant: Honor Device Co., Ltd., Shenzhen (CN)

(72) Inventors: Yan Mo, Shenzhen (CN); Hantao Cui, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/265,344

(22) PCT Filed: Dec. 26, 2022

(86) PCT No.: PCT/CN2022/142068
§ 371 (c)(1),
(2) Date: Jun. 5, 2023

(87) PCT Pub. No.: WO2023/173882
PCT Pub. Date: Sep. 21, 2023

(65) Prior Publication Data
US 2024/0406578 A1    Dec. 5, 2024

(30) Foreign Application Priority Data

Mar. 15, 2022    (CN) .......................... 202210255727.9

(51) Int. Cl.
*H04N 23/76* (2023.01)
*H04N 23/667* (2023.01)
(Continued)

(52) U.S. Cl.
CPC .......... *H04N 23/76* (2023.01); *H04N 23/667* (2023.01); *H04N 23/71* (2023.01); *H04N 23/741* (2023.01)

(58) Field of Classification Search
CPC ...... H04N 23/76; H04N 23/667; H04N 23/71; H04N 23/741; H04N 23/82
See application file for complete search history.

(56) References Cited

U.S. PATENT DOCUMENTS

| | | | |
|---|---|---|---|
| 7,554,548 B2 | 6/2009 | Furui | |
| 9,066,022 B2 * | 6/2015 | Tuttle | ..................... H04N 25/78 |

(Continued)

FOREIGN PATENT DOCUMENTS

| | | |
|---|---|---|
| CN | 1929624 A | 3/2007 |
| CN | 105379260 A | 3/2016 |

(Continued)

*Primary Examiner* — Ahmed A Berhan
(74) *Attorney, Agent, or Firm* — Slater Matsil, LLP (57) ABSTRACT

Embodiments of this application provide a logarithmic curve generation method, a device, and a storage medium. The method includes: determining a dynamic range of a photosensitive element of a mobile device and a coding depth of the mobile device; obtaining a plurality of numerical points within the dynamic range, where each numerical point includes a stop within the dynamic range and a corresponding code value; and performing curve fitting based on the plurality of numerical points to obtain a log curve, where when the mobile device shoots in a log mode, the log curve is used to convert, into a code value, a raw signal that is output by the photosensitive element and that indicates brightness.

19 Claims, 6 Drawing Sheets

(51) Int. Cl.
    *H04N 23/71*          (2023.01)
    *H04N 23/741*        (2023.01)

(56)                    References Cited

U.S. PATENT DOCUMENTS

| | | | |
|---|---|---|---|
| 10,194,162 B2 * | 1/2019 | Van Der Vleuten | H04N 9/67 |
| 10,218,917 B2 * | 2/2019 | Van Der Vleuten | H04N 23/741 |
| 10,707,895 B2 | 7/2020 | Fenney | |
| 10,902,567 B2 * | 1/2021 | Mertens | H04N 5/20 |
| 2006/0158529 A1 | 7/2006 | Katagiri | |
| 2010/0309346 A1 | 12/2010 | Brunner et al. | |
| 2013/0329084 A1 | 12/2013 | Tuttle | |
| 2018/0084177 A1 | 3/2018 | Hyodo et al. | |

FOREIGN PATENT DOCUMENTS

| | | |
|---|---|---|
| CN | 110662066 A | 1/2020 |
| CN | 113009462 A | 6/2021 |
| CN | 113096035 A | 7/2021 |
| CN | 113542608 A | 10/2021 |
| CN | 113570526 A | 10/2021 |
| CN | 113824913 A | 12/2021 |

* cited by examiner

LOGARITHMIC CURVE GENERATION METHOD, DEVICE, AND STORAGE MEDIUM

CROSS-REFERENCE TO RELATED APPLICATIONS

This application is a national stage of International Application No. PCT/CN2022/142068 filed on Dec. 26, 2022, which claims priority to Chinese Patent Application No. 202210255727.9 filed on Mar. 15, 2022. The disclosures of both of the aforementioned application are hereby incorporated by reference in their entireties.

TECHNICAL FIELD

This application relates to the field of camera technologies, and in particular, to a logarithmic curve generation method, a device, and a storage medium.

BACKGROUND

A logarithmic (Logarithm, LOG) curve is a curve commonly used on digital imaging devices (such as various digital cameras). The log curve reflects a mapping relationship between light intensity in a scenario and a brightness value recorded by an imaging device. When taking a picture, an imaging device converts, based on a log curve, a linear signal that is output by a photosensitive element and that indicates light intensity into a code value (code value), indicating brightness, into image data.

Currently, most logarithmic curves are designed for dedicated imaging devices, such as digital cameras. Due to a difference in capabilities of photosensitive elements between a dedicated imaging device and a general-purpose mobile device, a log curve of the dedicated imaging device is not applicable to the mobile device.

SUMMARY

This application provides a logarithmic curve generation method, a device, and a storage medium to provide a logarithmic curve applicable to a mobile device that can capture an image, so as to improve user experience during imaging of the mobile device.

To achieve the foregoing objective, this application provides the following technical solutions.

A first aspect this application provides a logarithmic curve generation method, including:
  determining a dynamic range of a photosensitive element of a mobile device and a coding depth of the mobile device;
  obtaining a plurality of numerical points within the dynamic range, where each numerical point includes a stop within the dynamic range and a corresponding code value; and
  performing curve fitting based on the plurality of numerical points to obtain a log curve, where when the mobile device shoots in a log mode, the log curve is used to convert, into a code value, a raw signal that is output by the photosensitive element and that indicates brightness;
  when a horizontal axis is scene reflectance and a vertical axis is normalized code value, a formula of the log curve is as follows:

if T_scene_reflection is greater than 0.0028, $$Y\_cv = 0.3145 \times \log_{10}(5.555556 \times T\_scene\_reflection + 0.07907) + 0.4471;$$

or
  if T_scene_reflection is not greater than 0.0028, $$Y\_cv = 11.4695 \times T\_scene\_reflection + 0.0928641;$$

and
  T_scene_reflection is the scene reflectance, and Y_cv is the normalized code value.

Beneficial effects of this solution are as follows:
The logarithmic curve satisfying photosensitive element performance of the mobile device is designed based on the dynamic range of the photosensitive element of the mobile device, so that when the mobile device shoots in a log mode, the photosensitive element performance of the mobile device can be fully utilized, thereby improving user experience.

In some optional embodiments, when the coding depth of the mobile device is 10 bits and the dynamic range is 11 stops, among the plurality of numerical points, a code value corresponding to stop−6 is 128, a code value corresponding to stop−5 is 149, a code value corresponding to stop−4 is 184, a code value corresponding to stop−3 is 235, a code value corresponding to stop−2 is 302, a code value corresponding to stop−1 is 381, a code value corresponding to stop 0 is 468, a code value corresponding to stop−1 is 560, a code value corresponding to stop 2 is 654, a code value corresponding to stop 3 is 749, a code value corresponding to stop 4 is 845, and a code value corresponding to stop 5 is 942; and
  a scene reflectance corresponding to stop 0 is 18%.

In some optional embodiments, when the scene reflectance is 0%, a code value of 8 bits determined based on the log curve is 24, a code value of 10 bits determined based on the log curve is 95, and an IRE value determined based on the log curve is 3.5%;
  when the scene reflectance is 18%, a code value of 8 bits determined based on the log curve is 116, a code value of 10 bits determined based on the log curve is 468, and an IRE value determined based on the log curve is 46.1%; or
  when the scene reflectance is 600%, a code value of 8 bits determined based on the log curve is 236, a code value of 10 bits determined based on the log curve is 948, and an IRE value determined based on the log curve is 100.9%.

In some optional embodiments, after the performing curve fitting based on the plurality of numerical points to obtain a log curve, the method further includes:
  determining an inverse log curve corresponding to the log curve; and
  when a vertical axis is scene reflectance and a horizontal axis is normalized code value, a formula of the inverse log curve is as follows:
  if Y_cv is greater than 0.1251, $$T\_scene\_reflection = 10^{(Y\_cv - 0.6813)/0.3145} - 0.0142;$$

or
if Y_cv is not greater than 0.1251, $$T\_scene\_reflection = (Y\_cv - 0.0928641)/11.4695. \quad (5)$$

Beneficial effects of this embodiment are as follows:

The mobile device can convert a photo or video in a log mode into a photo or video in a non-log mode by using the inverse log curve. Therefore, by determining the inverse log curve, the user can easily convert between photos or videos in different modes.

In some optional embodiments, the mobile device stores a table representing the log curve, and the table includes a plurality of x coordinates and corresponding y coordinates on the log curve.

Beneficial effects of this embodiment are as follows:

When shooting in the log mode, the mobile device can quickly obtain a code value by using data in the table. This helps save a computing resource of the mobile device.

In some optional embodiments, the mobile device stores a computer-executable function representing the log curve.

Beneficial effects of this embodiment are as follows:

The log curve is stored in a form of an executable function. This can reduce storage resources occupied to store the log curve.

In some optional embodiments, the dynamic range of the photosensitive element of the mobile device is determined based on a quantity of recognizable light spots in a raw image of a detection apparatus captured by the mobile device, and the detection apparatus displays a plurality of light spots with different brightness.

In some optional embodiments, color space corresponding to the log curve is color space ITU-R BT.2020. That is, a color of the photo or video, in the log mode, captured by the mobile device may be represented by using the color space ITU-R BT.2020.

Beneficial effects of this embodiment are as follows:

Compared with other color space, the color space ITU-R BT.2020 includes most colors within a recognizable range of human eyes. Therefore, by using the color space ITU-R BT.2020 to represent colors, a more colorful photo or video in the log mode can be obtained.

A second aspect of this application provides an electronic device, including a memory and one or more processors.

The memory is configured to store a computer program.

The one or more processors are configured to execute the computer program, and are specifically configured to implement the logarithmic curve generation method according to any one of the implementations of the first aspect.

A third aspect of this application provides a computer storage medium, configured to store a computer program, and when the computer program is executed, specifically configured to implement the logarithmic curve generation method according to any one of the implementations of the first aspect.

Embodiments of this application provide a logarithmic curve generation method, a device, and a storage medium. The method includes: determining a dynamic range of a photosensitive element of a mobile device and a coding depth of the mobile device; obtaining a plurality of numerical points within the dynamic range, where each numerical point includes a stop within the dynamic range and a corresponding code value; and performing curve fitting based on the plurality of numerical points to obtain a log curve, where when the mobile device shoots in a log mode, the log curve is used to convert, into a code value, a raw signal that is output by the photosensitive element and that indicates brightness. According to this solution, the dynamic range of the photosensitive element of the mobile device is detected, and the logarithmic curve is generated based on this to obtain the log curve satisfying photosensitive element performance of the mobile device. This helps fully utilize a capability of the photosensitive element of the mobile device during imaging.

DETAILED DESCRIPTION OF ILLUSTRATIVE EMBODIMENTS

The following describes the technical solutions in embodiments of this application clearly and completely with reference to the accompanying drawings in the embodiments of this application. Terms used in the following embodiments are only intended to describe particular embodiments, and are not intended to limit this application. The singular forms "one", "a", "the", "the foregoing", "this", and "the one" used in this specification and the appended claims of this application are also intended to include expression forms such as "one or more", unless otherwise clearly specified in the context. It may be further understood that in the embodiments of this application, "one or more" means one, two, or more, and the term "and/or" describes an association relationship of associated objects and represents that three relationships may exist. For example, A and/or B may represent the following three cases: Only A exists, both A and B exist, and only B exists, where A and B may be in singular forms or plural forms. The character "/" generally indicates an "or" relationship between associated objects.

Figure 1:
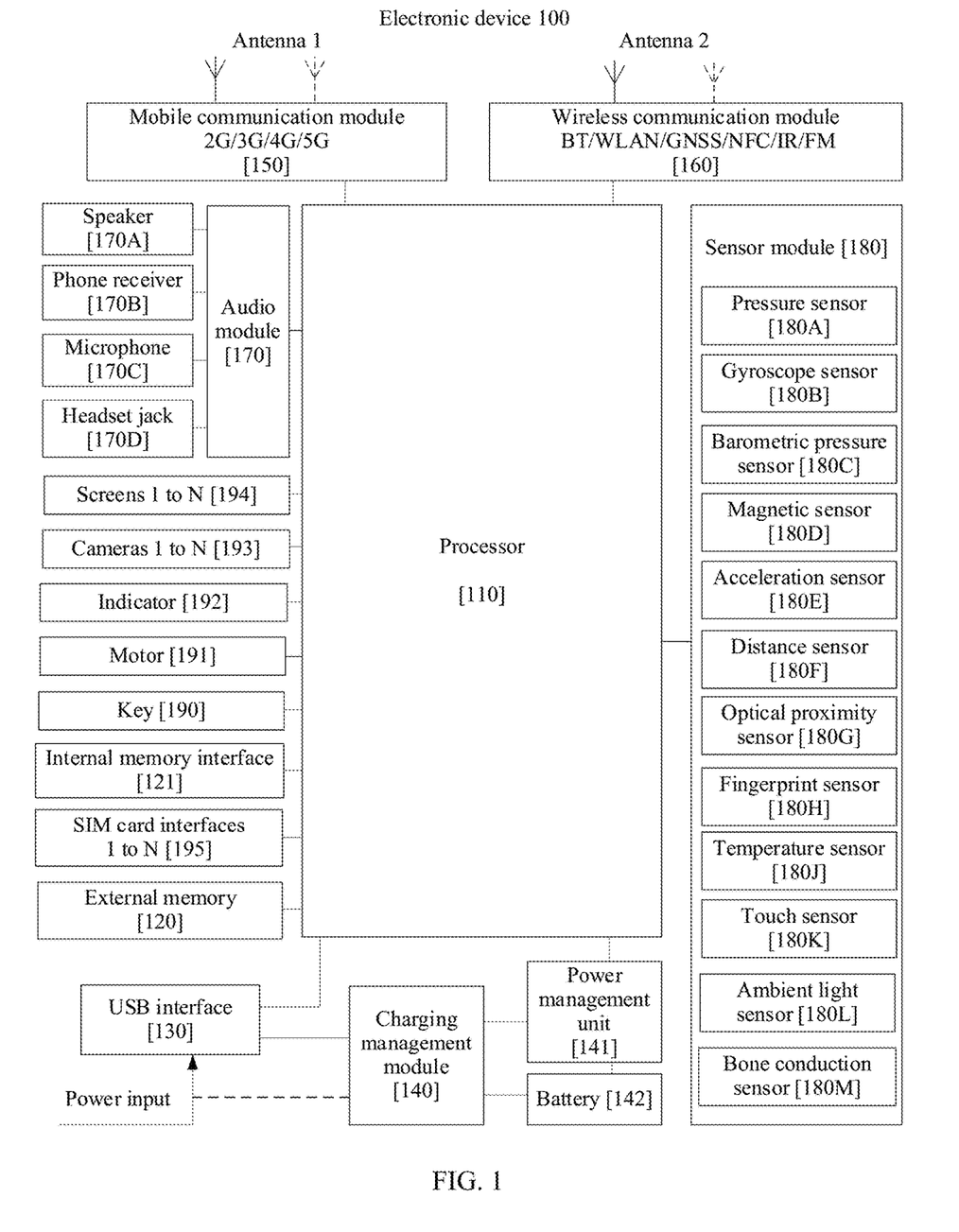
FIG. 1 is a schematic diagram of a structure of an electronic device according to an embodiment of this application.

An embodiment of this application provides an electronic device 100. As shown in FIG. 1, the electronic device 100 may specifically include a processor 110, an external memory 120, an internal memory (also referred to as an "inner memory") 121, a universal serial bus (universal serial bus, USB) interface 130, a charging management module 140, a power management unit 141, a battery 142, an antenna 1, an antenna 2, a mobile communication module 150, a wireless communication module 160, an audio module 170, a speaker 170A, a phone receiver 170B, a microphone 170C, a headset jack 170D, a sensor module 180, a key 190, a motor 191, an indicator 192, a camera 193, a screen 194, a subscriber identity module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The processor 110 may include one or more processing units. For example, the processor 110 may include an application processor (application processor, AP), a communication processor (communication processor, CP, which may also be referred to as a modem), a graphics processing unit (graphics processing unit, GPU), and the like.

The processor 110 may further be provided with a memory for storing instructions and data. In some embodiments, the memory in processor 110 is a cache memory. The memory may store instructions or data recently used or repeatedly used by the processor 110. If the processor 110 needs to use the instructions or the data again, the processor 110 may directly invoke the instructions or the data from the memory to avoid repeated access, and reduce a waiting time of the processor 110, thereby improving system efficiency.

The camera 193 may include one or more cameras. For example, the camera 193 may include one or more rear cameras installed on the back of the electronic device and one or more front cameras installed on the front (where the side on which the screen is located is the front) of the electronic device.

The screen 194 may include one or more screens. The electronic device displays a video, an image, and a series of graphical user interfaces on the screen. In some embodiments, the screen 194 and the touch sensor 180K may be combined into a touchscreen. A user may interact with the electronic device by tapping or sliding (with a finger or a stylus) on the touchscreen.

An audio playback device connected to the electronic device 100 may be a wired headset inserted into the headset jack 170D of the electronic device, or may be device such as a Bluetooth headset or a Bluetooth speaker connected to the electronic device through the wireless communication module 160 of the electronic device.

The camera 193 includes a photosensitive element. The photosensitive element may be a complementary metal-oxide-semiconductor (Complementary Metal-Oxide-Semiconductor, CMOS) sensor or a charge-coupled device (Charge-coupled Device, CCD). When irradiated by ambient light, the photosensitive element generates a linear raw signal indicating light intensity. The raw signal indicating the light intensity is converted by the processor into a code value, that is, image data captured by the electronic device 100.

The internal memory stores a pre-configured log curve of the electronic device 100.

When the electronic device 100 shoots (captures a photo or records a video) in a log mode, the processor receives the raw signal that is output by the camera and that indicates the light intensity (that is, the brightness), and then invokes a log curve of the internal memory to convert the raw signal into a corresponding code value, so as to obtain a photo or video in the log mode.

Compared with the non-log mode, an advantage of shooting in the log mode is that a corresponding raw signal with weaker light intensity can be encoded into a midtone code value. Therefore, a photo or video in the log mode better conforms to the human eye's log sensing rule for light, to be specific, human eyes are often more sensitive to details in a dark part, and are less sensitive to details in a bright part, maximizing the retention of information in the dark part of the photo or video.

The foregoing specifically describes the embodiments of this application by using the electronic device 100 as an example. It should be understood that a structure shown in this embodiment of this application does not constitute a specific limitation on the electronic device 100. The electronic device 100 may have more or fewer components than those shown in the figure, or may combine two or more components, or may have a different component configuration. The components shown in the figure may be implemented in hardware, software, or a combination of hardware and software that includes one or more signal processing and/or application-specific integrated circuits.

The electronic device provided in this embodiment of this application may be user equipment (user equipment, UE), such as a mobile terminal (for example, a user mobile phone), a tablet computer, a desktop computer, a laptop computer, a handheld computer, a netbook, or a personal digital assistant (personal digital assistant, PDA).

Photosensitive elements of different imaging devices usually have different dynamic ranges. For example, a photosensitive element of a dedicated imaging device such as a digital camera can have a dynamic range with 16 (stops) or more, and a photosensitive element of a mobile device such as a mobile phone or a tablet computer has a smaller dynamic range with generally 11 stops.

A dynamic range of a photosensitive element may be understood as a range from a lower brightness limit to an upper brightness limit that can be sensed by the photosensitive element during capture of an image. The dynamic range can be measured by stops. If two photosensitive elements are different by one stop, brightness thereof is different by one time. To be specific, brightness in stop 1 is two times brightness in stop 0, and brightness in stop 2 is two times brightness in stop 1. That is, in a frame of image captured by a dedicated imaging device such as a digital camera, the maximum brightness can be $2^{16}$ times the minimum brightness; in a frame of image captured by a mobile device such as a mobile phone, the maximum brightness can be $2^{11}$ times the minimum brightness.

Due to a difference in dynamic ranges, if a log curve of the dedicated imaging device is directly applied to the mobile device, photosensitive element performance of the mobile device cannot be fully exerted, resulting in a poor effect of a captured photo and video.

To resolve the foregoing problem, this application provides a logarithmic curve generation method and a logarithmic curve that is generated based on this method and that is applicable to a mobile device. The logarithmic curve generated by using the solution in this application can be applicable to a dynamic range of the mobile device, so that a photo or video with a better effect can be obtained when the mobile device shoots based on the logarithmic curve.

Figure 2:
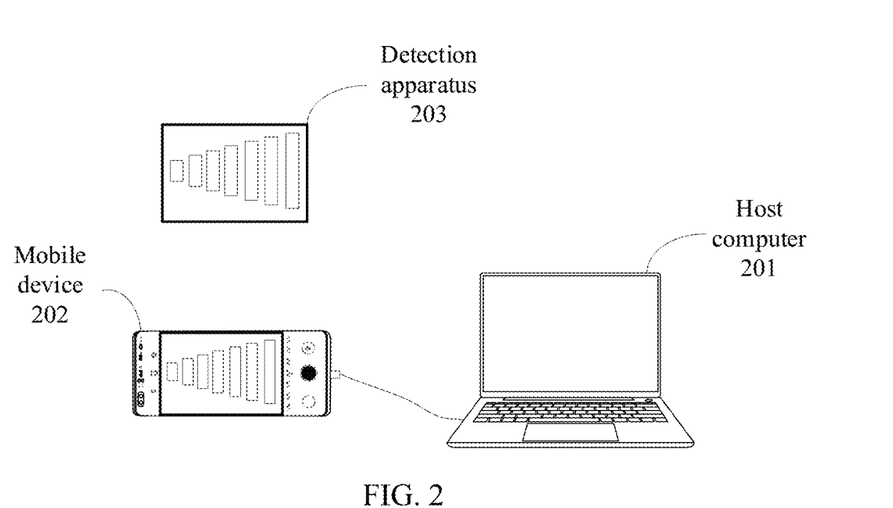
FIG. 2 is a schematic diagram of a structure of a logarithmic curve configuration system according to an embodiment of this application.

An embodiment of this application provides a system used to configure a logarithmic curve of a mobile device. As shown in FIG. 2, this system includes a host computer 201, a mobile device 202, and a detection apparatus 203. For a structure of the mobile device 202, refer to the electronic device 100 shown in FIG. 1. The host computer 201 is connected to the mobile device 202.

The detection apparatus 203 includes one or more luminescent components. After the detection apparatus is turned on, the luminescent component can form a plurality of light spots with different brightness arranged sequentially on the detection apparatus. The brightness of each light spot is different by one stop from the brightness of a neighboring light spot. For example, the brightness of the second light spot is two times the brightness of the first light spot, the brightness of the third light spot is two times the brightness of the second light spot, and the rest may be deduced by analogy.

After the detection apparatus is turned on, the mobile device 202 shoots the detection apparatus to obtain a raw image of the detection apparatus.

The raw image is an image of a raw format, and is an unprocessed image. Further, the raw image may be understood as that a photosensitive element of a camera converts a captured brightness signal into raw data of a digital signal. The raw file records the raw signal of the photosensitive element in a linear manner, and also records some files of meta data (Meta data such as photometric ISO (International Organization for Standardization, international organization for standardization) settings, a shutter speed, an aperture value, and white balance) generated during imaging. The raw format is an uncompressed format that has not been processed by an ISP nonlinearly. The full name of raw format is raw image format.

The mobile device 202 uploads the raw image of the detection apparatus to the host computer 201, and testing personnel can view the raw image of the detection apparatus by using dedicated software on the host computer 201. A quantity of recognizable light spots on the raw image of the detection apparatus reflects the dynamic range of the photosensitive element of the mobile device 202. For example, if a maximum of 11 light spots from the brightest to the darkest can be recognized on the raw image of the detection apparatus, it may be considered that the dynamic range of the photosensitive element of the mobile device 202 is 11 stops.

After the dynamic range is determined, code values corresponding to some stops within the dynamic range may be set based on balance between sensitivity and the dynamic range and a strategy preference of the mobile device for shooting high light and low light.

After the set code values and the corresponding stops are input into the host computer 201, the host computer 201 can obtain, through calculation, a log curve suitable for the mobile device 202 by executing a curve fitting algorithm based on the data.

After generating the log curve, the host computer 201 writes the log curve to the mobile device 202. When the mobile device 202 shoots in a log mode, the mobile device 202 can convert, by using the log curve, the raw signal of the brightness that is output by the camera into a nonlinear code value.

Figure 3:
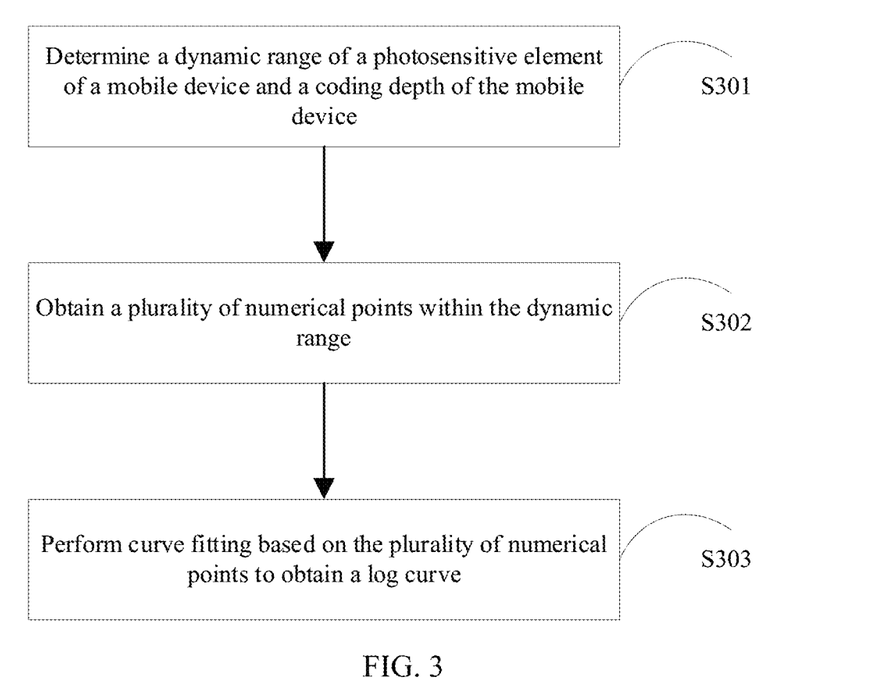
FIG. 3 is a flowchart of a logarithmic curve generation method according to an embodiment of this application.

Based on the system shown in FIG. 2, an embodiment of this application provides a logarithmic curve generation method. As shown in FIG. 3, the method may include the following steps.

In some optional embodiments, the host computer 201 may execute preset computer instructions to implement the steps in the method in this embodiment.

S301: Determine a dynamic range of a photosensitive element of a mobile device and a coding depth of the mobile device.

The dynamic range of the photosensitive element may be a value pre-calibrated by a manufacturer, or may be obtained by capturing the raw image of the detection apparatus by using the system shown in FIG. 2.

An advantage of detecting the dynamic range by capturing the raw image of the detection apparatus is that a more accurate dynamic range of the photosensitive element can be obtained, so that the generated log curve conforms to the photosensitive element performance better.

The coding depth, also referred to as a bit depth, indicates a quantity of bits occupied by one code value indicating brightness in the mobile device. In an example, a common bit depth of the mobile device may be 10 bits (bit), indicating that in a photo or video captured by the mobile device, one code value indicating brightness occupies 10 bits.

The coding depth of the mobile device decides a value range the code value of the mobile device. For example, if the coding depth is 8 bits, the value range of the code value of the mobile device is [0, 255]. If the coding depth is 10 bits, the value range of the code value of the mobile device is [0, 1023].

It should be noted that if the dynamic range determined in step S301 is not an integer, the dynamic range may be rounded to perform a subsequent step.

For example, if the dynamic range of the mobile device determined in S301 is 10.6 stops, a subsequent step may be performed by using the dynamic range as 11 stops.

S302: Obtain a plurality of numerical points within the dynamic range.

A numerical point may be understood as a correspondence between brightness of different stops and code values within the dynamic range. Step S302 is equivalent to determining code values corresponding to brightness of different stops within the dynamic range of the photosensitive element of the mobile device.

In step S302, stop 0 may be used as a base to divide the dynamic range of the photosensitive element into several stops above stop 0 and several stops below stop 0, and then, corresponding code values are set for some of the stops to obtain a plurality of numerical points.

The code values may be set based on the dynamic range of the photosensitive element in step S301, the coding depth of the mobile device, an exposure strategy preference, and related experience. A specific setting method is not limited in this embodiment.

Generally, a code value corresponding to brightness of a highest stop within the dynamic range can approximate an upper limit of the value range of the code value, a code value corresponding to brightness of a lowest stop may approximate a lower limit of the value range of the code value, and a code value corresponding to stop 0 may be set in a middle section of the value range of the code value.

In an example, a dynamic range of 11 stops may be divided in the following manner: 5 stops are set above stop 0, and 6 stops are set below stop 0, in other words, the dynamic range of the photosensitive element is divided into upper 5 stops and lower 6 stops.

It should be noted that the division manner for the dynamic range may be adjusted based on different application scenarios and requirements of the mobile device, and the foregoing division manner is merely an example.

After the dynamic range is divided, code values of a darkest point and a brightest point may further be set based on the coding depth. For example, the coding depth is 10 bits. In this case, the code value of the darkest point may be set to 95, and the code value of the brightest point may be set to 942. The darkest point indicates a pixel point with the lowest brightness in an image, and the brightest point indicates a pixel point with the highest brightness in an image.

Based on upper 5 stops and lower 6 stops and the code values of the darkest point and the brightest point, 5 numerical points shown in Table 1 may be set. In Table 1, "stop" indicates a stop within the dynamic range, and "code value" (CV) indicates a code value corresponding to each stop. For example, a code value corresponding to stop−6 is 128, a code value corresponding to stop 0 is 468, and a code value corresponding to stop 5 is 942.

TABLE 1

| Stop | −6 | −5 | −4 | −3 | −2 | −1 |
|---|---|---|---|---|---|---|
| Code value | 128 | 149 | 184 | 235 | 302 | 381 |
| Stop | 0 | 1 | 2 | 3 | 4 | 5 |
| Code value | 468 | 560 | 654 | 749 | 845 | 942 |

It can be understood that the numerical points shown in Table 1 are merely an example setting. In some optional embodiments, the code value corresponding to each stop within the dynamic range may be adjusted within a range. For example, the code value corresponding to stop 0 may be in the middle section of [0, 1023], that is, may be adjusted within a range of 300 to 500. In addition, a set stop is not limited to Table 1. For example, the code value corresponding to stop−4 may not be set but to set the code value of stop−3.

In Table 1, the code value of the lowest stop (namely, stop−6) within the dynamic range is greater than the foregoing code value of the darkest point. Such a setting can achieve the following purpose:

Brightness of a dark part in a photo and video in a log mode displayed on a screen can be increased, so that the photo and video in the log mode can present more details of the dark part when displayed on the screen.

S303: Perform curve fitting based on the plurality of numerical points to obtain a log curve.

Generally, the log curve may be expressed by using the following formula (1): $y = a \times \log_{10}(b \times x + c) + d$ where a, b, c, and d are parameters that need to be determined through curve fitting, and y and x indicate the vertical axis and the horizontal axis of the curve.

In step S303, the code values of the several stops that are set in S302 and corresponding scene reflectances are entered into curve fitting software in the host computer 201, and the function shown in formula (1) is specified as a fitting function. In this way, a, b, c and d in formula (1) can be obtained by using the curve fitting software. Determining the parameters a, b, c, and d is equivalent to generating a log curve.

The curve fitting process may be implemented by using any curve fitting software in a related technical field. This is not limited in this embodiment.

A conversion relationship between stop and scene reflectance can be expressed by using the following formula (2):

$$T\_scene\_reflection = 0.18 \times 2^{Stop}$$

T_scene_reflection is a scene reflectance, Stop indicates a stop, and 0.18 is the scene reflectance corresponding to stop 0. In the field of imaging technologies. The brightness of the light received by the photosensitive element can be expressed by using a scene reflectance.

In some optional embodiments, before curve fitting is performed, a code value in set numerical points may be converted into a normalized code value (denoted as Y_cv). That is, during curve fitting, the normalized code value is used as a dependent variable, and the scene reflectance is used as an independent variable for fitting.

A value range of the normalized code value is [0, 1]. A code value may be divided by a code value upper limit under a corresponding coding depth to obtain a corresponding normalized code value. On the contrary, a normalized code value may be multiplied by a code value upper limit in a particular coding depth to obtain a code value corresponding to the normalized code value under the coding depth.

For example, for a 10-bit coding depth, a normalized code value corresponding to the code value 468 is 468/1023, that is, 0.45748, and a code value corresponding to the normalized code value 0.3 under the 10-bit coding depth is 0.3*1023, that is, 536 (where only the integer part is reserved).

With reference to the example of Table 1, after the numerical points in Table 1 are converted into corresponding scene reflectances and normalized code values, the following formula (3) may be obtained through curve fitting:

if T_scene_reflection is greater than 0.0028, $$Y\_cv = 0.3145 \times \log_{10}(5.555556 \times T\_scene\_reflection + 0.07907) + 0.4471;$$

or if T_scene_reflection is not greater than 0.0028, $$Y\_cv = 11.4695 \times T\_scene\_reflection + 0.0928641.$$

The curve corresponding to formula (3) is a log curve generated based on the numerical points set in Table 1. For a form of the log curve, refer to FIG. 4.

Figure 4:
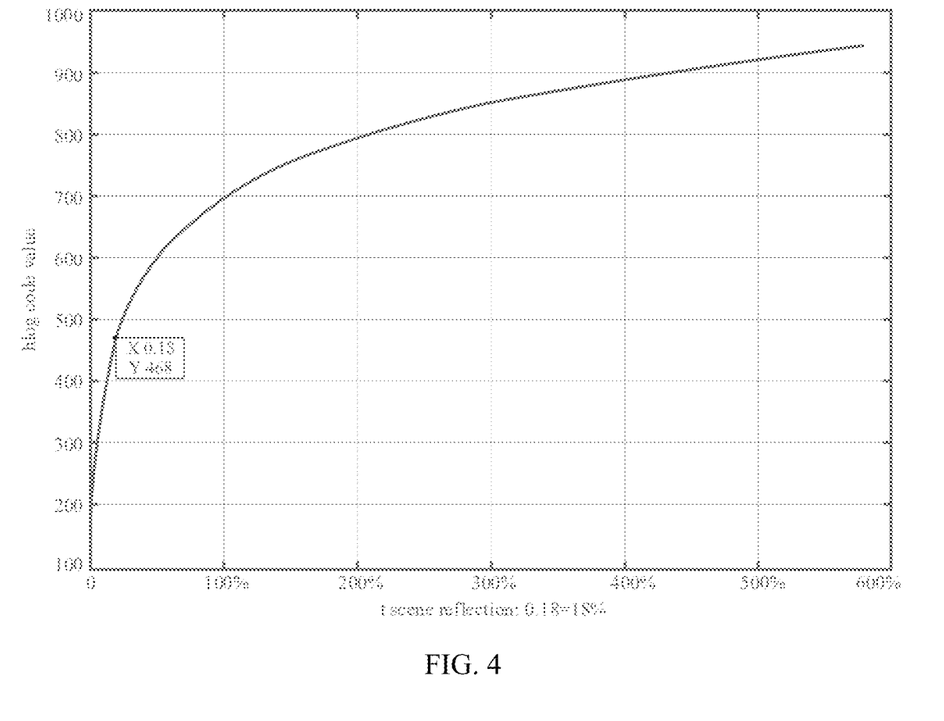
FIG. 4 is a schematic diagram of a logarithmic curve according to an embodiment of this application.

An advantage of using the normalized code value as a vertical axis of the log curve is as follows.

An application scope of the log curve may be expanded, so that one log curve can be applicable to other devices with approximate dynamic ranges but different coding depths. In other words, the log curve generated by using the normalized code value as the vertical axis can be directly applicable to two different devices with different coding depths but a same dynamic range of the photosensitive element without adjustment.

It should be noted that in the mobile device, the log curve may be expressed by using a plurality of different horizontal axes and vertical axes, but is not limited to the scene reflectance and the normalized code value shown in FIG. 4.

In an example, the vertical axis of the log curve may be IRE, a code value (Code Value, CV) under an 8-bit coding depth, or a code value under a 10-bit coding depth. IRE is a unit in video measurement, and is used to indicate a brightness stop in a video signal. The full name of IRE is institute of radio engineers. As shown in Table 2, Table 2 shows y coordinates corresponding to scene reflectances 0%, 18% (that is, 0.18), and 600% in the log curve shown in formula (3).

TABLE 2

| | Scene reflectance | | | | | | | |
|---|---|---|---|---|---|---|---|---|
| | 0% | | | 18% | | | 600% | |
| | | | | Y coordinate | | | | |
| | IRE | 10-bit CV | 8-bit CV | IRE | 10-bit CV | 8-bit CV | IRE | 10-bit | 8-bit |
| Value | 3.5% | 95 | 24 | 46.1% | 468 | 116 | 100.9% | 948 | 236 |

Figure 5:
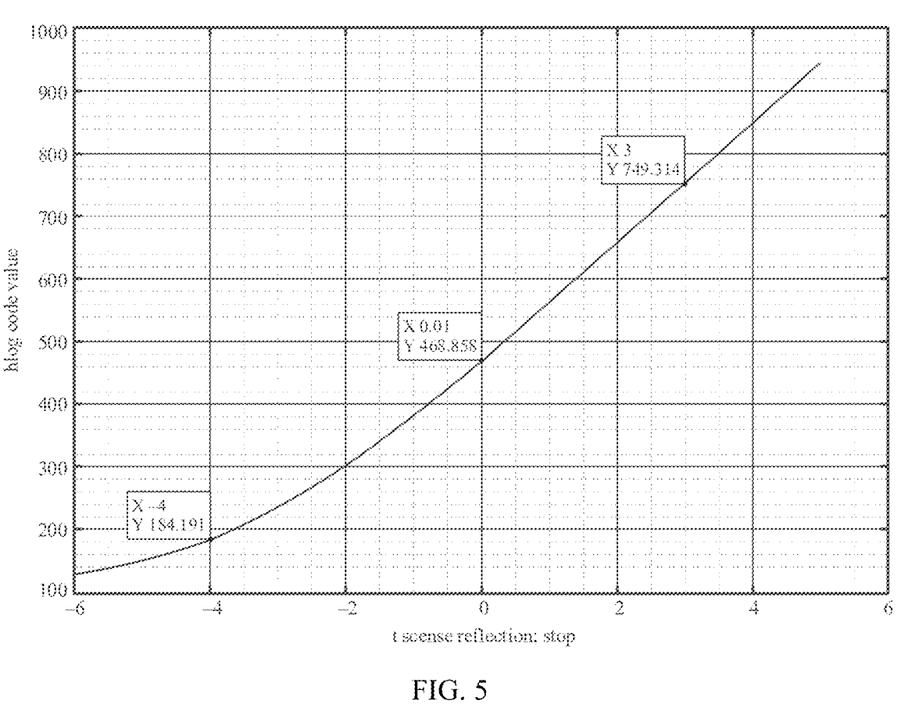
FIG. 5 is a schematic diagram of another logarithmic curve according to an embodiment of this application.

For example, the log curve shown in FIG. 4 in which the horizontal axis is scene reflectance and the vertical axis is normalized code value may be converted into the log curve shown in FIG. 5 in which the horizontal axis is stop and the vertical axis is code value under a 10-bit coding depth.

As described above, the generated logarithmic curve may be written by the host computer to the corresponding mobile device, and is stored in the memory of the mobile device. The mobile device may store the logarithmic curve in different forms based on an actual requirement.

In some examples, the mobile device may store the generated logarithmic curve in a form of a table, the table includes a plurality of points on the logarithmic curve, and each point includes a value indicating brightness and a code value corresponding to the brightness in the logarithmic curve. When shooting in the log mode, the mobile device can find the code value corresponding to the brightness in the table based on the raw signal that is output by the photosensitive element of the camera, to obtain a photo or video in the log mode.

An advantage of storing the log curve in the form of a table is that the corresponding code value does not need to be calculated during shooting in the log mode, thereby saving a computing resource of the mobile device.

In some other examples, the mobile device may store the logarithmic curve in a form of a computer-executable function, and the function includes values of a, b, c, and d shown in formula (1). When shooting in the log mode, the mobile device can invoke the function to calculate the raw signal that is output by the photosensitive element of the camera, to obtain the corresponding code value.

By storing the logarithmic curve in the form of a computer-executable function, storage space occupied by the logarithmic curve can be reduced.

Compared with a photo or video in a non-log mode, the photo or video in the log mode can retain more information about the dark part, but the contrast is lower. Therefore, after shooting is completed, the photo or video in the log mode needs to be post processed. In this case, the photo or video in the log mode needs to be converted into a photo or video in the non-log mode.

To implement the foregoing conversion, the mobile device may pre-store an inverse logarithmic curve. A horizontal axis of the inverse logarithmic curve indicates code value, and a vertical axis indicates brightness. When the photo or video in the log mode needs to be converted into a photo or video in the non-log mode, the mobile device may revert a code value in the photo or video in the log mode to a raw signal indicating brightness based on the inverse logarithmic curve, and then obtain the photo or video in the non-log mode through conversion based on the raw signal indicating the brightness.

Figure 6:
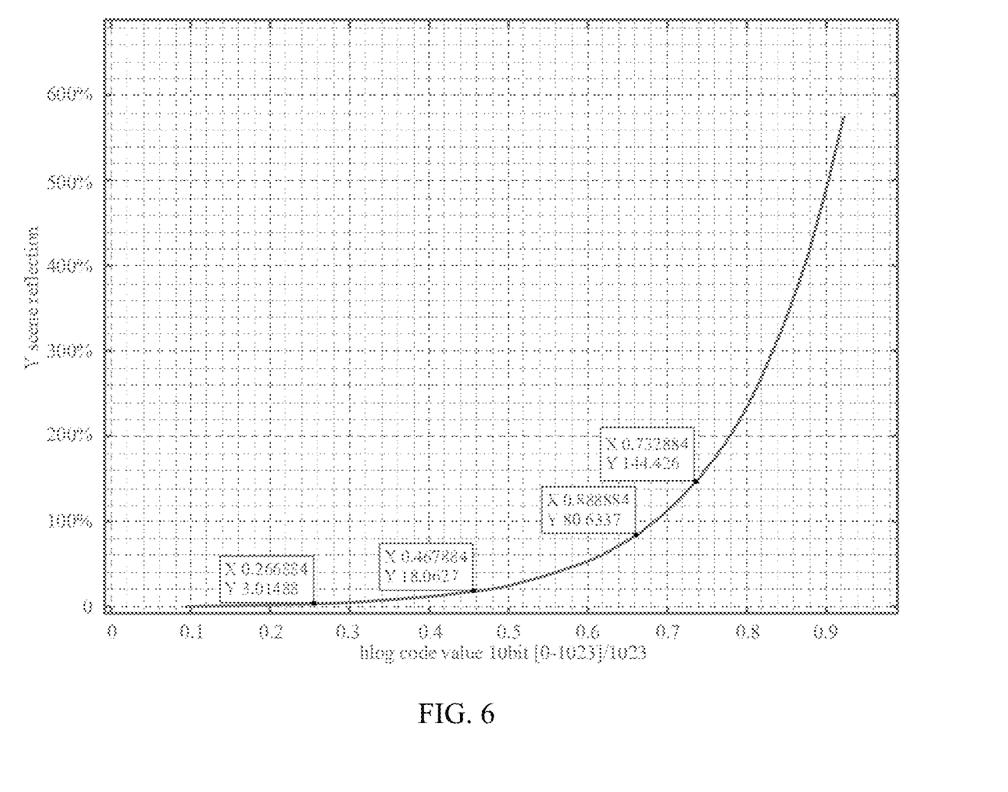
FIG. 6 is a schematic diagram of an inverse logarithmic curve according to an embodiment of this application.

For example, the inverse logarithmic curve (inverse log curve) corresponding to the logarithmic curve shown in formula (3) may be expressed by using the following formula (4)

if Y_cv is greater than 0.1251, $$T\_scene\_reflection = 10^{(Y\_cv - 0.6813)/0.3145} - 0.0142;$$

or if Y_cv is not greater than 0.1251, $$T\_scene\_reflection = (Y\_cv - 0.0928641)/11.4695.$$

For an image of the inverse logarithmic curve shown in formula (4), refer to FIG. 6. Meanings of the parameters in formula (4) are consistent with that in formula (3), and details are not described herein again.

Similar to the logarithmic curve, a horizontal axis and a vertical axis of the inverse logarithmic curve stored by the mobile device can also be adjusted based on an actual situation, and the mobile device can also store the inverse logarithmic curve in the form of a table or an executable function.

Beneficial effects of the logarithmic curve generation method provided in this application are as follows:

The log curve satisfying a characteristic of the mobile device is generated based on the dynamic range of the photosensitive element of the mobile device, so that when the mobile device shoots in the log mode, the dynamic range of the photosensitive element can be fully utilized, thereby facilitating retention details of the dark part and a highlight in a photo and video in the log mode.

When the mobile device shoots in the log mode, any color space may be selected based on a requirement and hardware performance. The color space used in the log mode is not limited in this embodiment. For example, when the mobile device shoots in the log mode, color space ITU-R BT.2020 may be used.

Figure 7:
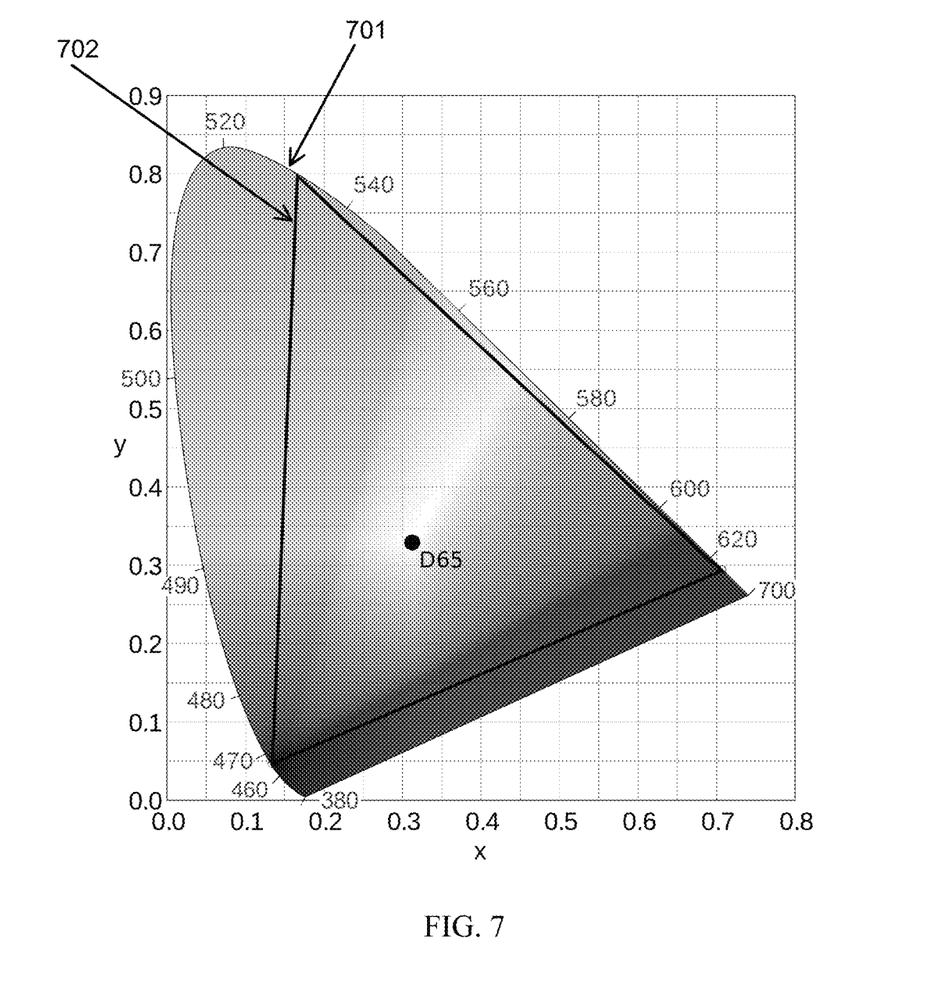
FIG. 7 is a schematic diagram of color space applicable to a log mode according to an embodiment of this application.

FIG. 7 is a schematic diagram of the color space ITU-R BT.2020. An area 701 surrounded by an irregular curve in FIG. 7 represents a color range that can be recognized by human eyes, and a triangular area 702 represents a color range that can be represented by the color space ITU-R BT.2020. Vertices 710, 711, and 712 in the triangle area sequentially represent pure green, pure blue, and pure red, and a vertex 713 in the triangle area represents white. For coordinates of the foregoing points in FIG. 7, refer to the following Table 3.

TABLE 3

| Represented color | X coordinate | Y coordinate |
| --- | --- | --- |
| White | 0.3127 | 0.3290 |
| Pure red | 0.708 | 0.292 |
| Pure green | 0.170 | 0.797 |
| Pure blue | 0.131 | 0.046 |

As can be learned, the color space ITU-R BT.2020 can represent most colors that can be recognized by human eyes. A more colorful photo or video can be obtained by shooting based on the color space ITU-R BT.2020.

An embodiment of this application provides an electronic device, including a memory and one or more processors.

The memory is configured to store a computer program.

The one or more processors are configured to execute the computer program, and are specifically configured to implement the logarithmic curve generation method provided in any one of the embodiments of this application.

In some optional embodiments, the electronic device may be the host computer 201 in the system shown in FIG. 2.

An embodiment of this application further provides a computer storage medium, configured to store a computer program, and when the computer program is executed, specifically configured to implement the logarithmic curve generation method provided in any one of the embodiments of this application.

In some optional embodiments, the computer storage medium may be the storage medium in the host computer 201 in the system shown in FIG. 2.

Reference to "an embodiment", "some embodiments", or the like described in this specification indicates that one or more embodiments of this application include a specific feature, structure, or characteristic described with reference to the embodiments. Therefore, the phrases "in an embodiment", "in some embodiments", "in some embodiments", "in some other embodiments", and the like in various places in this specification are not necessarily all refer to the same embodiment, but mean "one or more but not all embodiments" unless specifically emphasized otherwise. The terms "include", "comprise", "have" and their variants mean "including but not limited to" unless specifically emphasized otherwise.

A "plurality of" in the embodiments of this application means two or more. It should be noted that, in the descriptions of the embodiments of this application, terms such as "first" and "second" are only used for a purpose of distinguishing between descriptions, but cannot be understood as indicating or implying relative importance or indicating or implying a sequence.

What is claimed is:

1. A logarithmic curve generation method, comprising:
    determining a dynamic range of a photosensitive element of a mobile device and a coding depth of the mobile device;
    obtaining a plurality of numerical points within the dynamic range, wherein each numerical point comprises a stop within the dynamic range and a corresponding code value; and
    performing curve fitting based on the plurality of numerical points to obtain a log curve, wherein when the mobile device shoots in a log mode, the log curve is used to convert, into a code value, a raw signal that is output by the photosensitive element and that indicates brightness;
    when a horizontal axis is scene reflectance and a vertical axis is normalized code value, a formula of the log curve is as follows:
    when T_scene_reflection is greater than 0.0028, $$Y\_cv = 0.3145 \times \log_{10}(5.555556 \times T\_scene\_reflection + 0.07907) + 0.4471;$$

or
when T_scene_reflection is not greater than 0.0028, $$Y\_cv = 11.4695 \times T\_scene\_reflection + 0.0928641;$$

and
    wherein T_scene_reflection is the scene reflectance, and Y_cv is the normalized code value.

2. The method according to claim 1, wherein when the coding depth of the mobile device is 10 bits and the dynamic range is 11 stops, among the plurality of numerical points, a code value corresponding to stop −6 is 128, a code value corresponding to stop −5 is 149, a code value corresponding to stop −4 is 184, a code value corresponding to stop −3 is 235, a code value corresponding to stop −2 is 302, a code value corresponding to stop −1 is 381, a code value corresponding to stop 0 is 468, a code value corresponding to stop 1 is 560, a code value corresponding to stop 2 is 654, a code value corresponding to stop 3 is 749, a code value corresponding to stop 4 is 845, and a code value corresponding to stop 5 is 942; and
    a scene reflectance corresponding to stop 0 is 18%.

3. The method according to claim 1, wherein:
    when the scene reflectance is 0%, a code value of 8 bits determined based on the log curve is 24, a code value of 10 bits determined based on the log curve is 95, and an IRE value determined based on the log curve is 3.5%;
    when the scene reflectance is 18%, a code value of 8 bits determined based on the log curve is 116, a code value of 10 bits determined based on the log curve is 468, and an IRE value determined based on the log curve is 46.1%; or
    when the scene reflectance is 600%, a code value of 8 bits determined based on the log curve is 236, a code value of 10 bits determined based on the log curve is 948, and an IRE value determined based on the log curve is 100.9%.

4. The method according to claim 1, wherein after the performing curve fitting based on the plurality of numerical points to obtain a log curve, the method further comprises:
    determining an inverse log curve corresponding to the log curve; and
    when a vertical axis is scene reflectance and a horizontal axis is normalized code value, a formula of the inverse log curve is as follows:
    when Y_cv is greater than 0.1251, $$T\_scene\_reflection = 10^{(Y\_cv - 0.6813)/0.3145} - 0.0142;$$

or
when Y_cv is not greater than 0.1251, $$T\_scene\_reflection = (Y\_cv - 0.0928641)/11.4695.$$

5. The method according to claim 1, wherein the mobile device stores a table representing the log curve, and the table comprises a plurality of x coordinates and corresponding y coordinates on the log curve.

6. The method according to claim 1, wherein the mobile device stores a computer-executable function representing the log curve.

7. The method according to claim 1, wherein the dynamic range of the photosensitive element of the mobile device is determined based on a quantity of recognizable light spots in a raw image of a detection apparatus captured by the mobile device, and the detection apparatus displays a plurality of light spots with different brightness.

8. The method according to claim 1, wherein color space corresponding to the log curve is color space ITU-R BT.2020.

9. An electronic device, comprising a memory and one or more processors, wherein
    the memory is configured to store a computer program; and
    the one or more processors are configured to execute the computer program, and executing the computer program causes the electronic device to:
        determine a dynamic range of a photosensitive element of a mobile device and a coding depth of the mobile device;
        obtain a plurality of numerical points within the dynamic range, wherein each numerical point comprises a stop within the dynamic range and a corresponding code value; and perform curve fitting based on the plurality of numerical points to obtain a log curve, wherein when the mobile device shoots in a log mode, the log curve is used to convert, into a code value, a raw signal that is output by the photosensitive element and that indicates brightness;

wherein when a horizontal axis is scene reflectance and a vertical axis is normalized code value, a formula of the log curve is as follows:

when T_scene_reflection is greater than 0.0028, $$Y\_cv = 0.3145 \times \log_{10}(5.555556 \times T\_scene\_reflection + 0.07907) + 0.4471;$$

or when T_scene_reflection is not greater than 0.0028, $$Y\_cv = 11.4695 \times T\_scene\_reflection + 0.0928641;$$

and wherein T_scene_reflection is the scene reflectance, and Y_cv is the normalized code value.

10. The electronic device according to claim 9, wherein when the coding depth of the mobile device is 10 bits and the dynamic range is 11 stops, among the plurality of numerical points, a code value corresponding to stop −6 is 128, a code value corresponding to stop −5 is 149, a code value corresponding to stop −4 is 184, a code value corresponding to stop −3 is 235, a code value corresponding to stop −2 is 302, a code value corresponding to stop −1 is 381, a code value corresponding to stop 0 is 468, a code value corresponding to stop 1 is 560, a code value corresponding to stop 2 is 654, a code value corresponding to stop 3 is 749, a code value corresponding to stop 4 is 845, and a code value corresponding to stop 5 is 942; and a scene reflectance corresponding to stop 0 is 18%.

11. The electronic device according to claim 9, wherein:

when the scene reflectance is 0%, a code value of 8 bits determined based on the log curve is 24, a code value of 10 bits determined based on the log curve is 95, and an IRE value determined based on the log curve is 3.5%;

when the scene reflectance is 18%, a code value of 8 bits determined based on the log curve is 116, a code value of 10 bits determined based on the log curve is 468, and an IRE value determined based on the log curve is 46.1%; or when the scene reflectance is 600%, a code value of 8 bits determined based on the log curve is 236, a code value of 10 bits determined based on the log curve is 948, and an IRE value determined based on the log curve is 100.9%.

12. The electronic device according to claim 9, wherein executing the computer program further causes the electronic device to:

after performing curve fitting based on the plurality of numerical points to obtain the log curve, determining an inverse log curve corresponding to the log curve; and when a vertical axis is scene reflectance and a horizontal axis is normalized code value, a formula of the inverse log curve is as follows:

when Y_cv is greater than 0.1251, $$T\_scene\_reflection = 10^{(Y\_cv - 0.6813)/0.3145} - 0.0142;$$

or when Y_cv is not greater than 0.1251, $$T\_scene\_reflection = (Y\_cv - 0.0928641)/11.4695.$$

13. The electronic device according to claim 9, wherein the mobile device stores a table representing the log curve, and the table comprises a plurality of x coordinates and corresponding y coordinates on the log curve.

14. The electronic device according to claim 9, wherein the mobile device stores a computer-executable function representing the log curve.

15. The electronic device according to claim 9, wherein the dynamic range of the photosensitive element of the mobile device is determined based on a quantity of recognizable light spots in a raw image of a detection apparatus captured by the mobile device, and the detection apparatus displays a plurality of light spots with different brightness.

16. The electronic device according to claim 9, wherein color space corresponding to the log curve is color space ITU-R BT.2020.

17. A non-transitory computer storage medium, configured to store a computer program, and when the computer program is executed, an electronic device is caused to:

determine a dynamic range of a photosensitive element of a mobile device and a coding depth of the mobile device;

obtain a plurality of numerical points within the dynamic range, wherein each numerical point comprises a stop within the dynamic range and a corresponding code value; and perform curve fitting based on the plurality of numerical points to obtain a log curve, wherein when the mobile device shoots in a log mode, the log curve is used to convert, into a code value, a raw signal that is output by the photosensitive element and that indicates brightness;

wherein when a horizontal axis is scene reflectance and a vertical axis is normalized code value, a formula of the log curve is as follows:

when T_scene_reflection is greater than 0.0028, $$Y\_cv = 0.3145 \times \log_{10}(5.555556 \times T\_scene\_reflection + 0.07907) + 0.4471;$$

or when T_scene_reflection is not greater than 0.0028, $$Y\_cv = 11.4695 \times T\_scene\_reflection + 0.0928641;$$

and wherein T_scene_reflection is the scene reflectance, and Y_cv is the normalized code value.

18. The non-transitory computer storage medium according to claim 17, wherein when the coding depth of the mobile device is 10 bits and the dynamic range is 11 stops, among the plurality of numerical points, a code value corresponding to stop −6 is 128, a code value corresponding to stop −5 is 149, a code value corresponding to stop −4 is 184, a code value corresponding to stop −3 is 235, a code value corresponding to stop −2 is 302, a code value corresponding to stop −1 is 381, a code value corresponding to stop 0 is 468, a code value corresponding to stop 1 is 560, a code value corresponding to stop 2 is 654, a code value corresponding to stop 3 is 749, a code value corresponding to stop 4 is 845, and a code value corresponding to stop 5 is 942; and a scene reflectance corresponding to stop 0 is 18%.

19. The non-transitory computer storage medium according to claim 17, wherein:
when the scene reflectance is 0%, a code value of 8 bits determined based on the log curve is 24, a code value of 10 bits determined based on the log curve is 95, and an IRE value determined based on the log curve is 3.5%;
when the scene reflectance is 18%, a code value of 8 bits determined based on the log curve is 116, a code value of 10 bits determined based on the log curve is 468, and an IRE value determined based on the log curve is 46.1%; or
when the scene reflectance is 600%, a code value of 8 bits determined based on the log curve is 236, a code value of 10 bits determined based on the log curve is 948, and an IRE value determined based on the log curve is 100.9%.

* * * * *